H. L. Houghton,
Tile Machine.

N° 14,177.      Patented Jan. 29, 1856.

Witnesses;
D. M. Smith
E. Dunklee

Inventor;
Hiram L. Houghton

UNITED STATES PATENT OFFICE.

HIRAM L. HOUGHTON, OF SPRINGFIELD, VERMONT, ASSIGNOR TO ABEL H. GRENNELL.

MACHINE FOR CUTTING MOLDINGS ON MARBLE.

Specification of Letters Patent No. 14,177, dated January 29, 1856.

*To all whom it may concern:*

Be it known that I, HIRAM L. HOUGHTON, of Springfield, in the county of Windsor and State of Vermont, have invented new and useful improvements on the molding-bed or machine for cutting rectilinear moldings upon marble by means of revolving disks or grinders with their edges cut to the counterpart form of the desired molding; and I do hereby declare that the following is a full, clear, and exact description of the construction and operation of the same, reference being had to the annexed drawings, making a part of this specification, in which—

Figure 1:
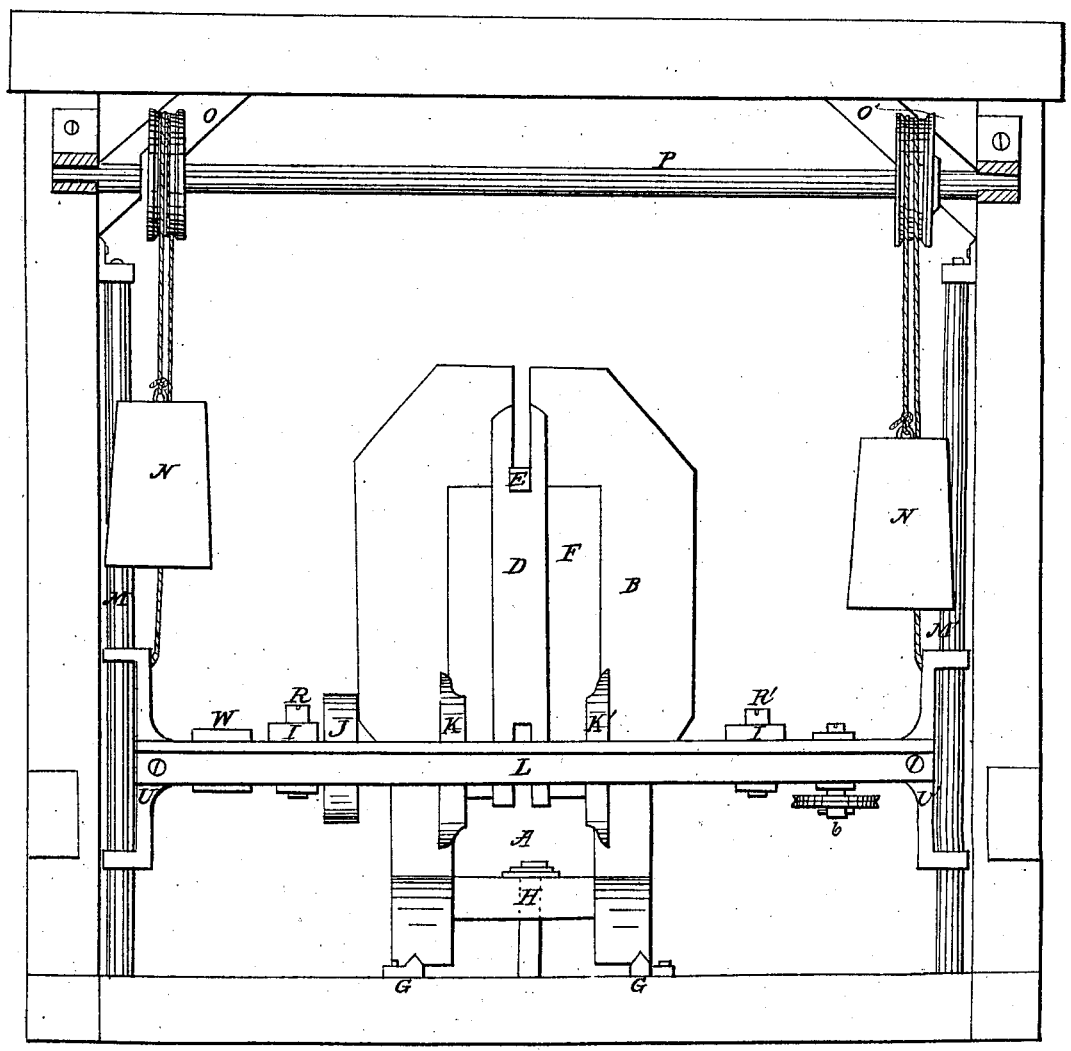
Figure 2:
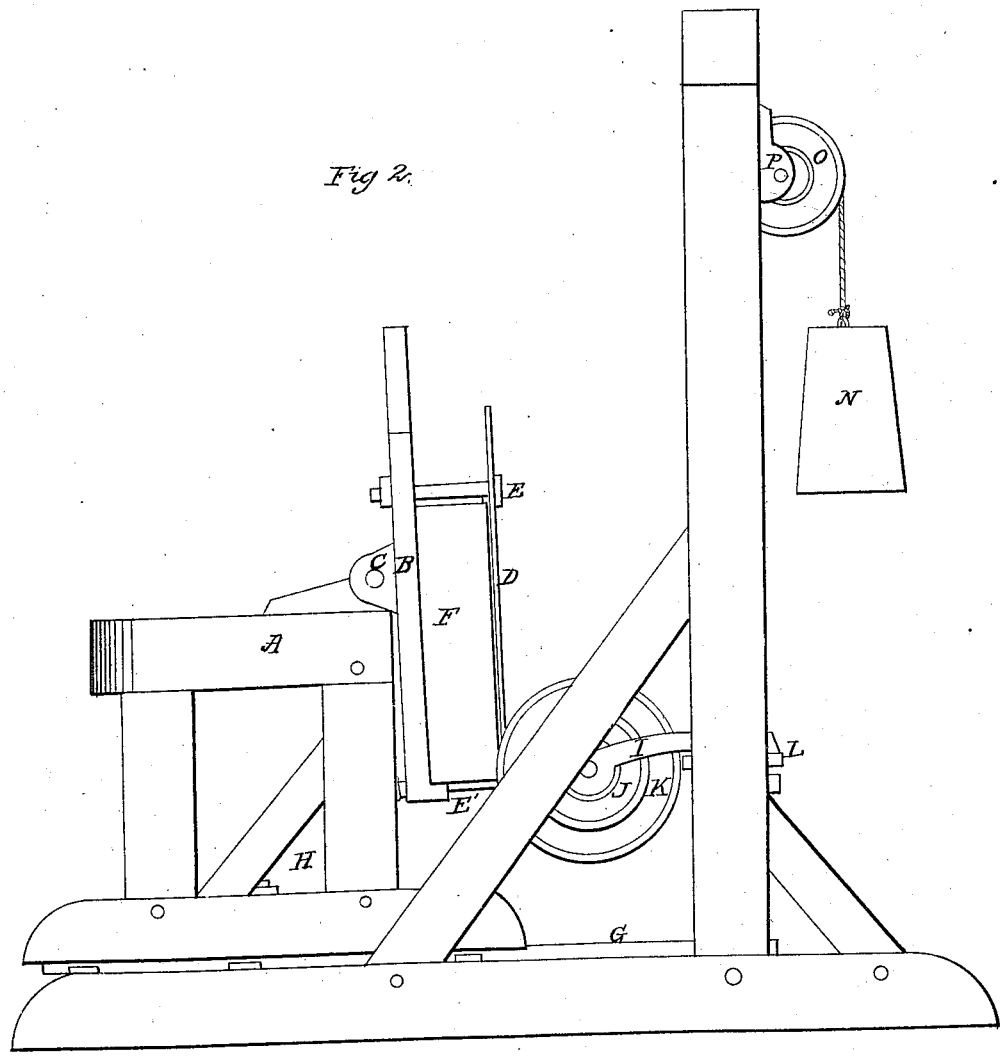
Figure 3:
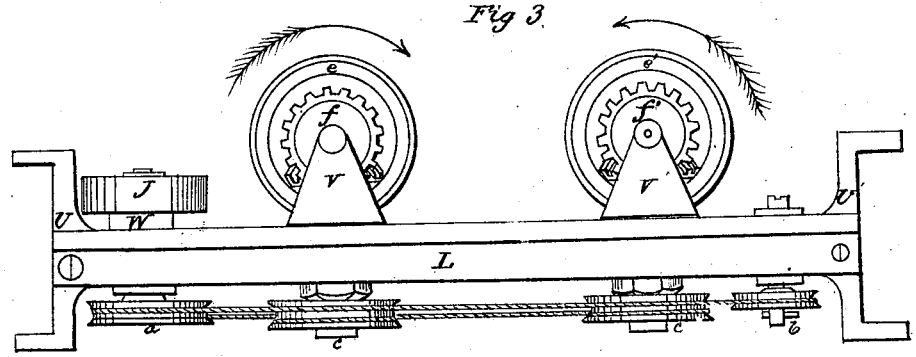
Figure 4:
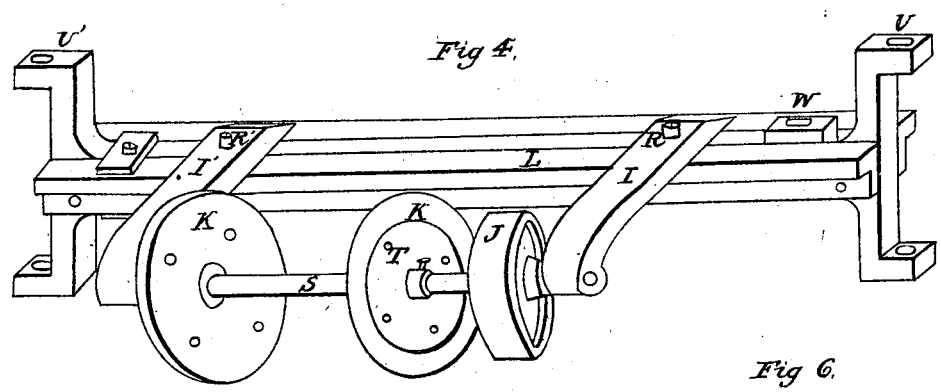
Figure 5:
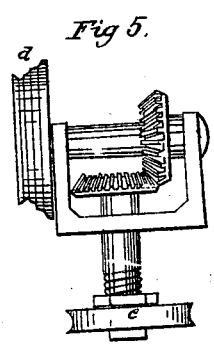
Figure 7:
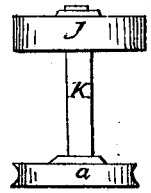
Figure 6:
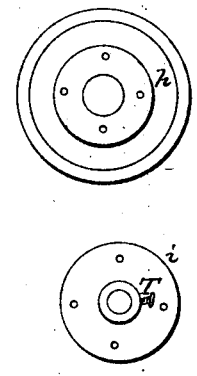

Figure 1 is a front elevation of the improved machine. Fig. 2 is a longitudinal elevation. Fig. 3 is a longitudinal elevation of the contrivance for cutting moldings upon the edges of blocks and for cutting such moldings upon the face as require the disks to be placed against the edge. Fig. 4 is an isometrical view of the same frame with the gearing shown in Fig. 3 removed and that substituted which is to be used for working upon the face of the blocks. Fig. 5 is one of the disks with bevel gear shown in Fig. 3. Fig. 6 is a plan of one of these disks with its face plate, and Fig. 7 is the driving pulley as used in Fig. 3.

In Figs. 1 and 2, "A," represents a table or frame of sufficient strength to sustain the marble, with a movable top "B," turning from a horizontal to a vertical position upon the hinge "C."

"F" represents the marble to be operated upon; "D," the iron band or bar confining it in its place by means of the bolts and nuts "E" and "E'," the whole sliding forward or backward upon the track "G" and then fastened in its proper place by the bolt and nuts "H."

"I" represents an arm sustaining at one end one end of the shaft which revolves the disks "K" and "K'" by means of the driving pulley "J" where the power is applied. The other end is firmly attached to the frame "L" by a set screw "R," so that it may be capable of adjustment. These are shown more fully in Fig. 4.

"L," Fig. 1, is the frame sustaining the revolving disks and their gearing, sliding upward and downward on the rods "M" and "M'," by means of the guides "U" and "U'," shown in Fig. 4, partially balanced by the weights "N" and "N'," suspended over the pulleys "O" and "O'," attached to the revolving axis "P."

"S" in Fig. 4, is the axis to which the disks are attached (when used as in Figs. 1 and 2,) by set screws one of which in Fig. 4 is marked "T."

"W," Fig. 4, is a socket to receive the shaft shown in Fig. 7. In Fig. 3, "V" and "V'" represent the gearing shown in Fig. 5, $e$ and $e'$ being the disks, $f$ and $f'$, the bevel gear set in motion by a belt around the pulleys $c$ and $c'$.

$d$, Fig. 5, is a representation of one of the disks.

In Fig. 6, $h$ is one of the cast iron disks or grinders, and $i$ is the face plate to which it is attached by screws, and it is then fastened to the axis, by the set screw "T."

In Fig. 7, $k$, is a shaft to which, at one end is attached the pulley $a$, to the other the driving pulley J can be attached by a set screw.

Having described the construction of the machine I will now briefly explain its operation.

The top of the table B, being in a horizontal position, the block of marble to be cut, F, is placed upon it and firmly attached to it by the bar D and bolts E and E'. It is then turned upon the hinge C to a vertical position advanced upon the truck G to the proper point, and there secured by the bolt H. If I desire to use the disks in the manner shown in Figs. 1, 2 and 4, they are then adjusted to the desired places upon the axis S, and secured by the set screws I. The frame L with the machinery is then elevated to a height that will bring the cutting edges of the disks to the top of the block to be cut. The disks are caused to rotate from behind forward toward the marble, and a stream of sand and water poured from above so as to fall in the space between the disk and the marble, and the weight of the machine gradually carries it to the bottom, cutting as it proceeds the counterpart form desired. But if the molding desired be of such a nature that it cannot be cut upon the face with the above contrivance, but may upon the edge, I make use of the contrivance shown in Figs. 3 and 5. The marble remains in the same position as before and the machine is elevaed as before, the only difference being the substitution of a new device for cutting the molding upon both edges. First, the arms I and I with their attachments as shown in Fig. 4, are removed from the frame L, the driving pulley J is removed from the shaft S, the shaft K attached to the pulley a (Fig. 7) is placed in the socket W (Fig. 4) and the pulley J attached to the top of the shaft by a set screw. The disks V and V' with their gearing (shown in Fig. 3 and Fig. 4), are placed in the frame and fastened there by nuts, and a bond is applied to the pulleys a, b, c, c', in such a manner as to cause the disks to rotate in the direction of the arrows in Fig. 3. The disks being adjusted to the proper points at the top of the marble, the bond is applied, the power put on and the machine descends.

Heretofore, in machines for cutting moldings upon marble, the bench or table upon which the marble is placed to be cut, is drawn gradually forward against the saws by a weight passing over a pulley, and of course the power of the weight varies with the varying weight of the marble slabs to be operated upon. In my invention I elevate my machinery for cutting to the top of the slab, which stands in a vertical position, and its own weight pressing down the grinders upon the marble, answers the object of the weight before spoken of, and is of course constant and equal. Heretofore, also, when the marble lay in a horizontal position, there was more difficulty in feeding with sand than in my machine, as it had to be pressed against the rear of the grinders and carried by their rotary motion beneath them, whereas, in my machine, the sand being poured on from above upon the point where the grinders come in contact with the marble, penetrates more easily between them. It has also been the practice to fasten the marble to be cut to the bed or table with plaster of Paris. In my invention I accomplish the purpose by means of a bar or strip of iron crossing the marble lengthwise, secured at either end to the movable table-top, by bolts and nuts.

Machines have been used before in cutting moldings only upon narrow and thin slabs, and, as constructed, were unable to operate upon large blocks, if at all, without inconvenience. Moldings could only be cut upon the edge of narrow slips, and many moldings can only be cut upon the edge on account of the returning of the curves of which the molding is composed, as for instance the "Attic base" so called. And unless the size of the slab permitted it to be raised upon its edge, so as to bring the disk or grinder against the opposite edge, it would not be cut, and even then but on one edge at a time. In my invention on the contrary, it matters little how large the block to be cut may be. The machine may as well be drawn up fifteen feet as two, while it also cuts both edges at one operation. As I desired on the last account, as well as on account of the advantages gained by moving the cutters downward, instead of the marble forward, that my marble should stand when operated on, vertically, I devised the above described table with movable top, and the mode of fastening the marble to the same, so as to secure ease and rapidity of adjustment as well as verticality; and the track, to advance or recede the block or slab of marble as occasion might require.

Having above described my invention, I do not claim the cutting of rectilinear moldings upon marble by the use of revolving disks or grinders that having been known before; but What I do claim and desire to secure by Letters Patent is:

The method above described of cutting moldings upon the edges of blocks by the employment of the disks K K' or e e' and the adjustable table top B operating in the manner and for the purpose above set forth and described.

HIRAM L. HOUGHTON.

Witnesses:
JOHN WARD,
D. M. SMITH.